United States Patent
Hart et al.

(10) Patent No.: US 11,156,503 B2
(45) Date of Patent: Oct. 26, 2021

(54) WAVEFRONT SENSOR DEVICE AND METHOD

(71) Applicant: Arizona Board of Regents on Behalf of the University of Arizona, Tucson, AZ (US)

(72) Inventors: Michael Hart, Tucson, AZ (US); Charlotte Guthery, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 118 days.

(21) Appl. No.: 16/533,068

(22) Filed: Aug. 6, 2019

(65) Prior Publication Data

US 2020/0041351 A1 Feb. 6, 2020

Related U.S. Application Data

(60) Provisional application No. 62/715,098, filed on Aug. 6, 2018.

(51) Int. Cl.
*G01J 9/00* (2006.01)

(52) U.S. Cl.
CPC ...................... *G01J 9/00* (2013.01)

(58) Field of Classification Search
CPC ........... G01J 9/00; G01J 1/0407; G01J 1/0411
See application file for complete search history.

(56) References Cited

U.S. PATENT DOCUMENTS

| | | | |
|---|---|---|---|
| 2017/0146427 A1* | 5/2017 | Liang | G01M 11/0257 |
| 2018/0067237 A1* | 3/2018 | Vandame | G02B 13/0015 |

OTHER PUBLICATIONS

Ragazzoni et al., "A pyramid wavefront sensor with no dynamic modulation," May 22, 2002, Elsevier Science, Optics Communications 208 (2002) 51-60 (Year: 2002).*
Engler, B. et al., Wavefront Sensing with Prisms for Astronomical Imaging with Adaptive Optics, 2017 International Conference on Image and Vision Computing New Zealand (IVCNZ), Christchurch, pp. 1-7, 2017.
Platt, B. C. et al., History and Principles of Shack-Hartmann Wavefront Sensing, J. Refractive Surgery, vol. 17, pp. S573-S577, Sep./Oct. 2001.

(Continued)

*Primary Examiner* — Thanh Luu
*Assistant Examiner* — Monica T Taba
(74) *Attorney, Agent, or Firm* — Perkins Coie LLP

(57) ABSTRACT

Methods, devices and systems are disclosed that enable accurate and reliable measurements of wavefront aberrations with a wide dynamic range. The described wavefront sensors can be implemented at a low cost and without any moving parts. One wavefront sensor includes an optical pyramid positioned to receive a focused incoming light beam. The optical pyramid includes three facets that each allow a portion of the focused incoming light beam to exit the optical pyramid. The wavefront sensor also includes one or more imaging lenses positioned to receive light that exits each of the facets of the optical pyramid, and one or more lenslet arrays positioned to receive light from the one or more imaging lenses and to produce a plurality of focused light spots corresponding to each lenslet of the lenslet array.

22 Claims, 9 Drawing Sheets

(56) References Cited

OTHER PUBLICATIONS

Pugh, N. et al., Pupil-imaging wavefront gradient sensor, SPIE vol. 2534, pp. 312-317, Aug. 25, 1995.
Ragazzoni, R., Pupil plane wave sensing with an oscillating prism, J. Mod. Opt. 43 No. 2, pp. 289-293, 1996.
Chen, L. et al., Experimental Demonstration of Sequential Operation Approach for a Three-Sided Pyramid Wavefront Sensor, IEEE Photonics Journal, vol. 8: No. 4, Aug. 2016.
Codona, J. L. et al., Comparative Performance of a 3-Sided and 4-Sided Pyramid Wavefront Sensor, Advanced Maui Optical and Space Surveillance Technologies Conference (AMOS), 2018.

* cited by examiner

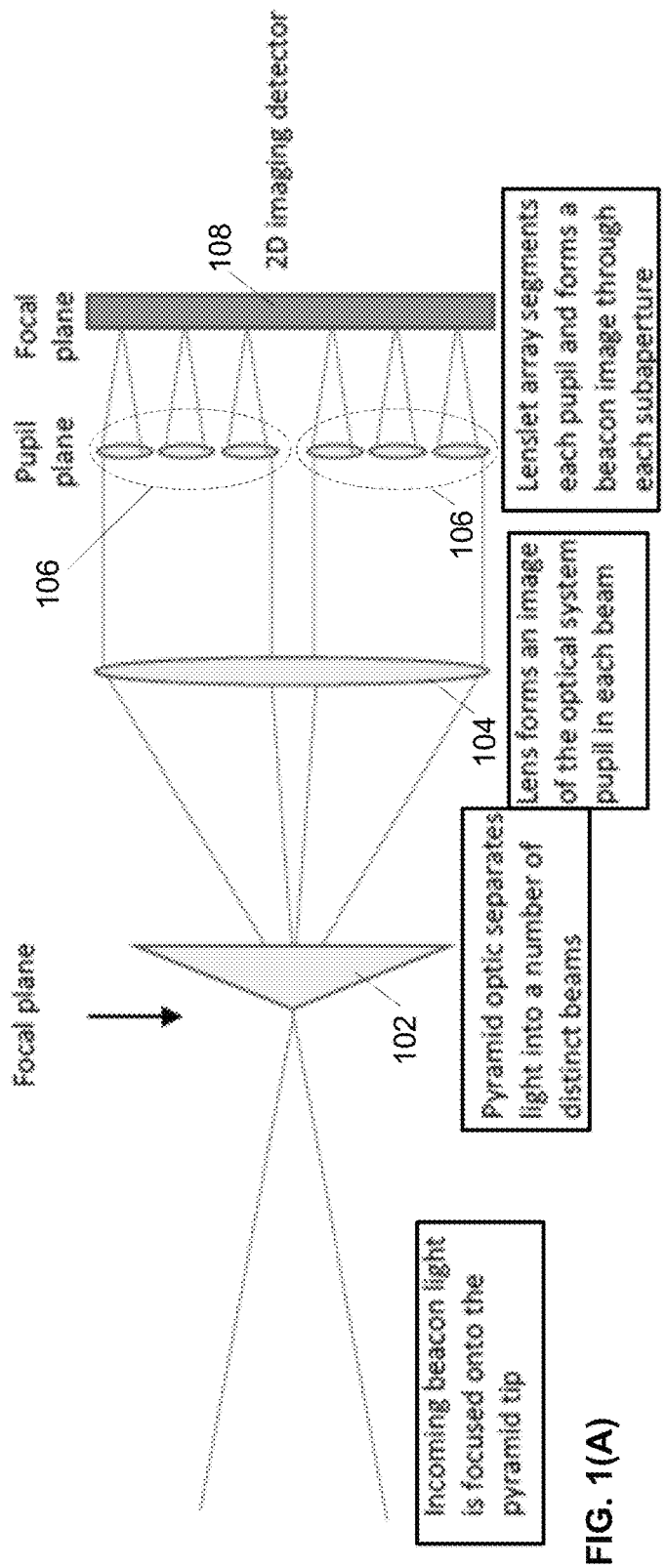
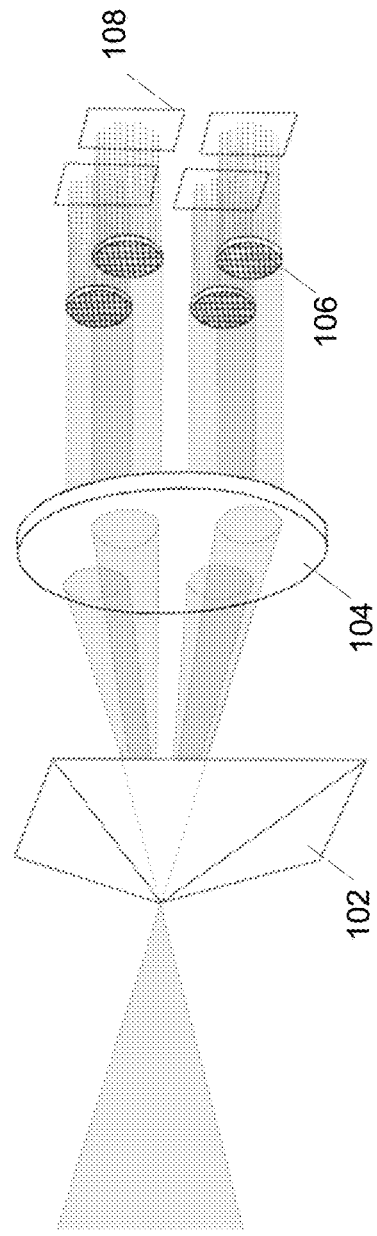
FIG. 1(A)
FIG. 1(B)

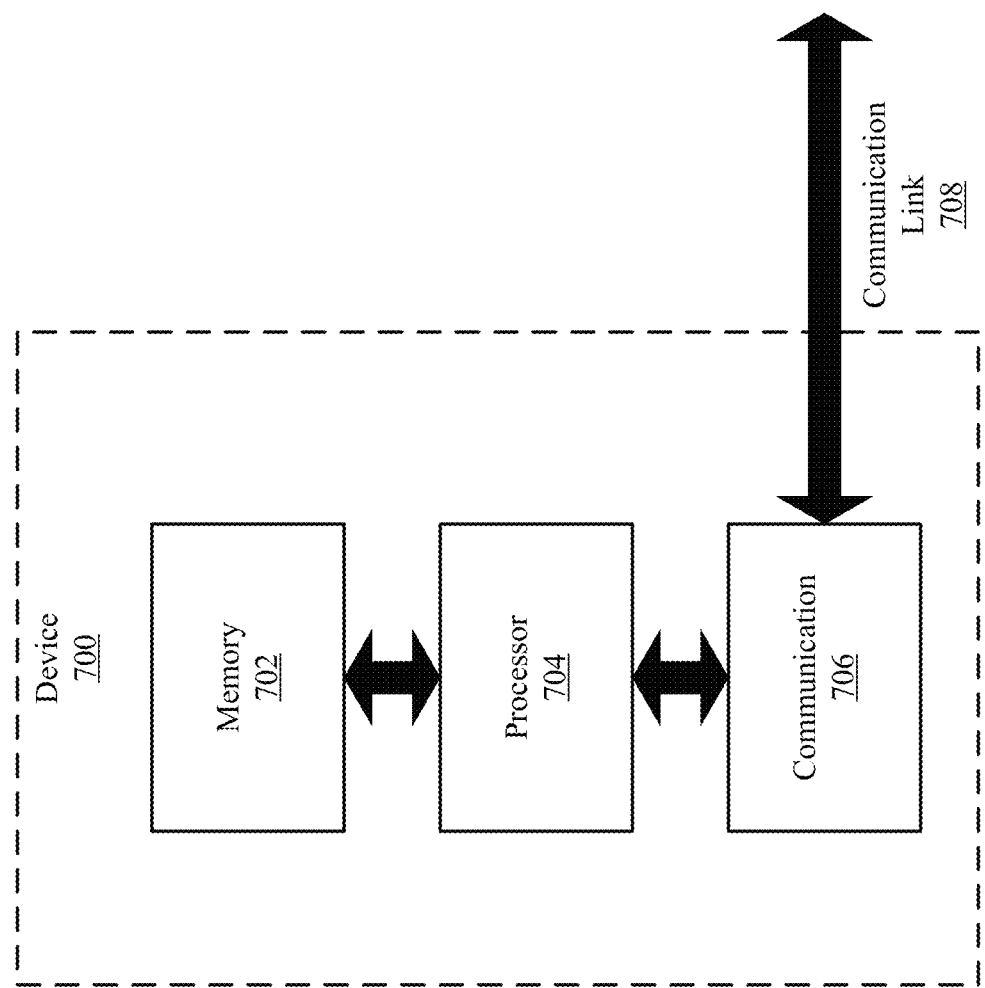

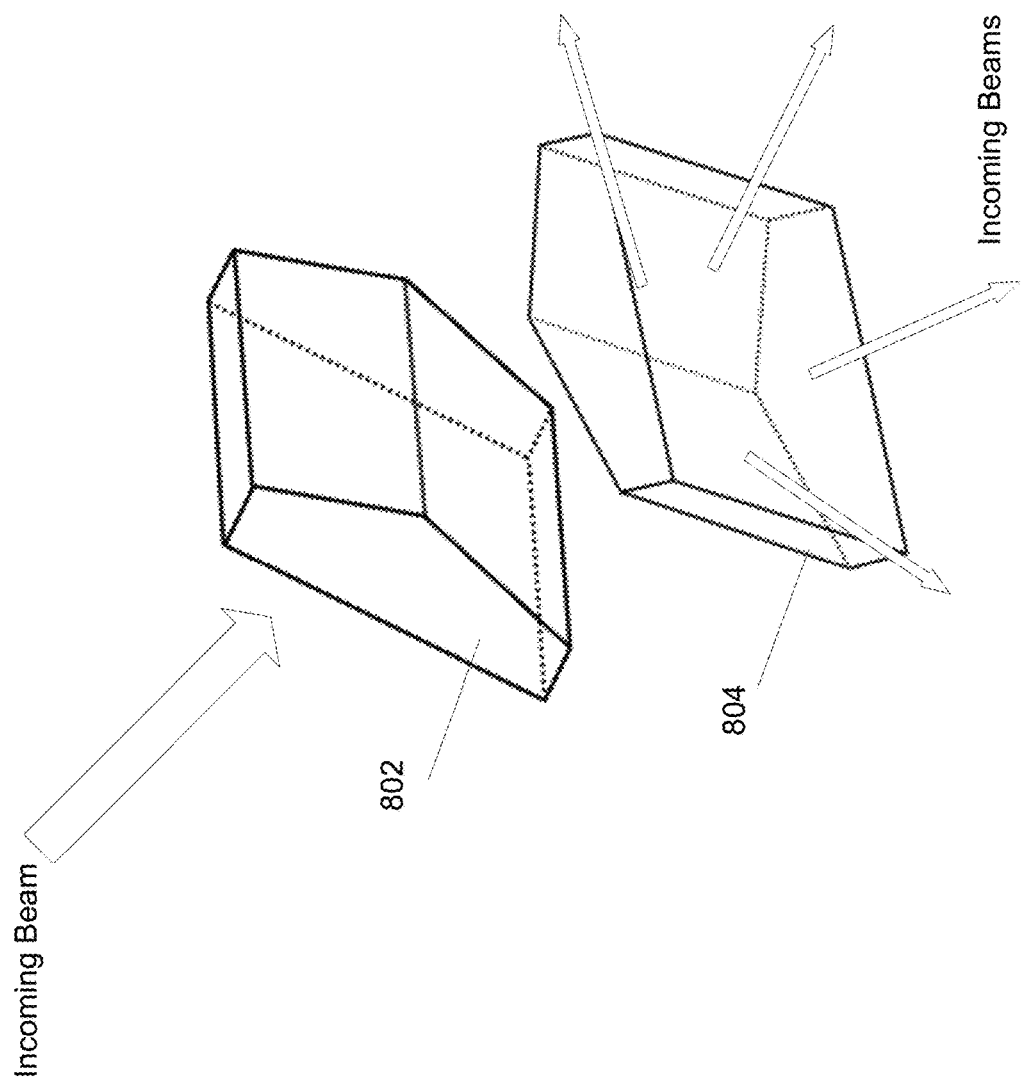

Receive a set of intensity values from a wavefront sensor device that includes both an optical pyramid comprising multiple facets, and a plurality of lenslet arrays that receive the light exiting the plurality of pyramid facets
902

Obtain a first estimate of the wavefront aberration associated with the light that exits each of the plurality of lenslets in the lenslet arrays
904

Obtain a second estimate of the wavefront aberration associated the light that exits the pyramid facets
906

Combine the first estimate and the second estimate to obtain a final aberration estimate
908

FIG. 9

WAVEFRONT SENSOR DEVICE AND METHOD

CROSS REFERENCE TO RELATED APPLICATIONS

This application claims priority to the provisional application with Ser. No. 62/715,098, titled "Improved Wavefront Sensor Device and Method," filed Aug. 6, 2018. The entire contents of the above noted provisional application are incorporated by reference as part of the disclosure of this document.

TECHNICAL FIELD

The subject matter of this patent document generally relates to optical wavefront sensing and particularly to systems, devices and methods for measuring, characterizing and determining errors in optical wavefronts.

BACKGROUND

Wavefront sensing is a class of optical techniques used to measure aberrations that lead to image blurring. One application of wavefront sensing is in adaptive optics which correct optical aberrations that blur the images seen by an optical system looking through a turbulent medium such as the Earth's atmosphere or a body of water. Crucial to the operation of an adaptive optics system is the wavefront sensor which measures the aberration to be corrected.

An ideal wavefront sensor has three properties: (1) high sensitivity: producing a strong signal in response to a small amount of optical aberration; (2) wide dynamic range: producing a monotonically varying signal in response to aberration changes from small to large; and (3) linearity: producing a signal that depends linearly on the aberration. Several wavefront sensing technologies have been developed and fielded at telescopes around the world, primarily for astronomical and/or military space surveillance purposes. The existing wavefront sensing systems, however, cannot provide all three desired features of wide dynamic range, high sensitivity and linearity. Therefore, there is a need for systems, devices and methods that can simultaneously deliver all the desired properties of a wavefront sensor.

BRIEF DESCRIPTION OF THE DRAWINGS

FIG. 1(A) illustrates a wavefront sensor in accordance with an exemplary embodiment.

FIG. 1(B) illustrates a three-dimensional representation of a wavefront sensor in accordance with an exemplary embodiment.

FIG. 7 illustrates a block diagram of a device that can be used to implement certain aspects of the disclosed technology.

FIG. 8 illustrates an example of a crossed-roof prim that can be used as part of the disclosed wavefront sensors.

FIG. 9 illustrates a set of operations that can be carried out to produce an estimate of a wavefront aberration in accordance with an exemplary embodiment.

SUMMARY OF CERTAIN EMBODIMENTS

Figure 2:
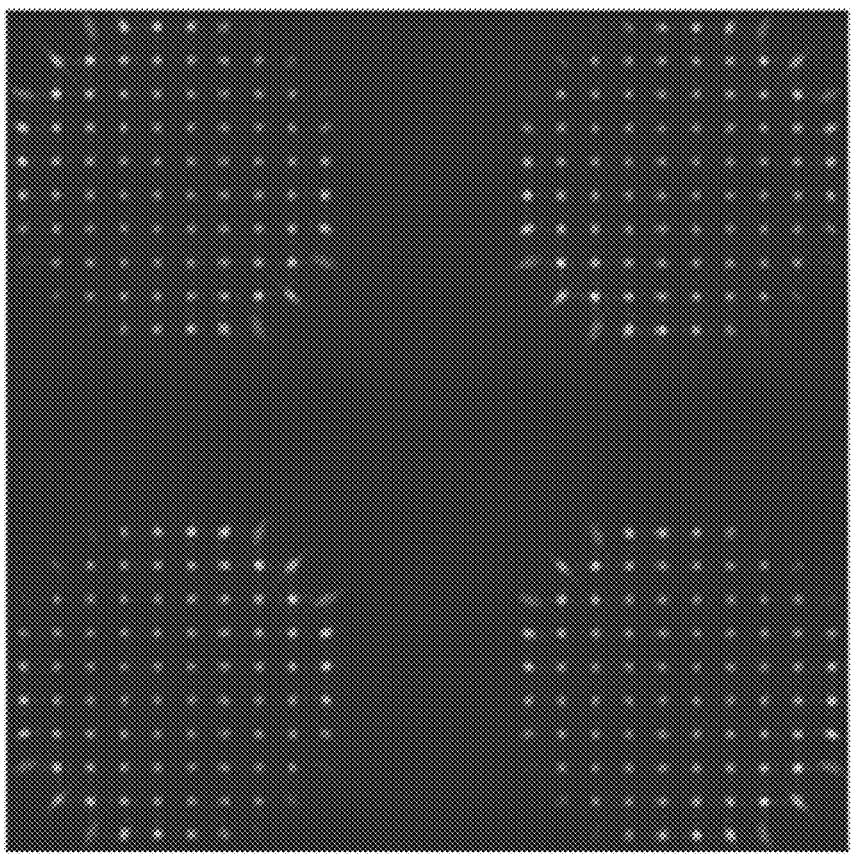
FIG. 2 illustrates an example image at the detector plane of the wavefront sensor of FIGS. 1(A) and 1(B).

The disclosed embodiments relate to methods, devices and systems for measuring wavefront errors with high accuracy, wide dynamic range and linearity. The disclosed embodiments enable the production of cost effective and reliable wavefront sensors that can be used in wide-ranging applications, such as earth-to-space and space-to-space communications, among others.

One example wavefront sensor includes an optical pyramid positioned to receive a focused incoming light beam on a tip of the optical pyramid; the optical pyramid includes at least three facets that each allow a portion of the focused incoming light beam to exit the optical pyramid. The wavefront sensor also includes one or more imaging lenses positioned to receive light that exits each of the facets of the optical pyramid, and one or more lenslet arrays positioned to receive light from the one or more imaging lenses and to produce a plurality of focused light spots corresponding to each lenslet of the lenslet array. The focused light spots produced by the lenslet arrays, upon detection of by a detector, enable a determination of a wavefront error of the incoming light beam.

DETAILED DESCRIPTION

In the following description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

As noted earlier, the existing wavefront sensing technologies are not capable of producing all three desirable features of high sensitivity, wide dynamic range, and linearity at the same time. One existing wavefront sensor, the Shack-Hartmann type, has a wide dynamic range and a linear response but poor sensitivity. By contrast, another existing sensor, the pyramid wavefront sensor, has excellent sensitivity, but exhibits a linear response only over a narrow dynamic range. Focal-plane phase-diverse wavefront sensing is another technique that can provide high sensitivity over a large range, but the estimation algorithm is very non-linear. The disclosed technology combines aspects of the pyramid and the Shack-Hartmann wavefront sensors into a device that can provide all three desirable properties of a wavefront sensor, in addition to other features and benefits described herein.

FIG. 1(A) illustrates a two-dimensional representation of a wavefront sensor in accordance with an exemplary embodiment. FIG. 1(B) illustrates a three-dimensional representation of the wavefront sensor. As illustrated in FIGS. 1(A) and 1(B), light from a light source (e.g., collected by the telescope from a beacon) is focused onto the tip of an optical pyramid 102. The pyramid 102 breaks the light into separate beams, one per pyramid facet. In some implementations, the pyramid 102 is a 4-sided pyramid. In another implementation, the pyramid 102 can have three sides, while in other implementations, the pyramid 102 can have more than 4 sides. Moreover, the pyramid 102 can be transmissive (as shown), or reflective having internal surfaces that reflect the received light onto a different direction.

In FIGS. 1(A) and 1(B), a lens 104 forms an image of the optical system (e.g., telescope) pupil separately in each of the beams that exit the pyramid facets. While FIGS. 1(A) and 1(B) depict a single lens 104 for illustrative purposes, in some implementations, four (or more generally, a plurality of) lenses may implement the relay lens for the beams that exit the pyramid 104. The configurations of FIGS. 1(A) and 1(B) further include four (or in general a plurality of) lenslet arrays 106 similar to the Shack-Hartmann configuration. The lenslet arrays 106 subdivide each of the pupil images into contiguous regions. In some implementations, the lenslet arrays 106 may all be physically on the same substrate. The incoming (beacon) light is separately imaged through each pupil region onto one or more detectors 108. The detector 108 can, for example, be a CCD camera. FIG. 2 shows an example of an image produced at the imaging detector 108 for an implementation that uses a 4-sided pyramid looking at an unresolved beacon through an imaging system with an unobstructed circular aperture. The detector 108 can be implemented as a single detector (as in FIG. 1(A)), or as a plurality of detectors (e.g., as in FIG. 1(B)).

The front end of the system of FIGS. 1(A) and 1(B) operates as a pyramid sensor in which each beam is deflected, forming images of the telescope pupil, similar to the Foucault knife-edge test. Aberrations cause the focused spot positioned at the top of the pyramid to change, thus changing the light intensity (that otherwise would be equal) at one or more of the beams that exit the pyramid. By computing the normalized intensity differences, the signals proportional to the wavefront slopes can be detected. In a Shack-Hartmann sensor, the image formed by each lens of the lenslet array forms a spot at the image sensor (as shown in the exemplary pattern of FIG. 2), and the displacement of the spots from their nominal positions (e.g., when no aberrations are present) is proportional to the wavefront slope. The performance of the Shack-Hartmann sensor depends on how well the displacement of the spot is estimated.

The disclosed wavefront sensors, as exemplified by the systems in FIGS. 1(A) and 1(B), operate as combined wavefront sensors, where each of the beams exiting the pyramid is incident on a corresponding set of lenslets that form spots at their focal plane that are then detected by the imaging detector. The signals from the disclosed wavefront sensors may be processed either as a conventional pyramid wavefront sensor, or as a conventional Shack-Hartmann wavefront sensor, or jointly to yield an improved estimate of the wavefront aberration over a dynamic range with the wide limitation of a Shack-Hartmann type rather than the narrow range of the conventional pyramid type. The signals from the image sensor(s) 108 are received by a computer or a device (not shown in FIGS. 1(A) and 1(B), but illustrated by the way of example in FIG. 7) that includes processing capabilities for analyzing the received signals from the sensor, computing wavefront aberrations or wavefront errors and associated parameters. In implementations of the disclosed technology for adaptive optics, a signal indicative of wavefront aberration or associated parameters may be provided to another system to allow real-time compensation for the wavefront errors.

The disclosed device realizes the individual benefits of the Shack-Hartmann and pyramid wavefront sensors within their respective operating ranges. That is, when estimating low-amplitude aberration, e.g., less than approximately one wave rms at the sensing wavelength, the device exhibits the same high sensitivity as the pyramid wavefront sensor. Outside that range, the device continues to provide aberration measurements out to an amplitude of approximately ten waves rms or more, depending on the details of the construction, with the reduced sensitivity of the Shack-Hartmann wavefront sensor.

Figure 3:
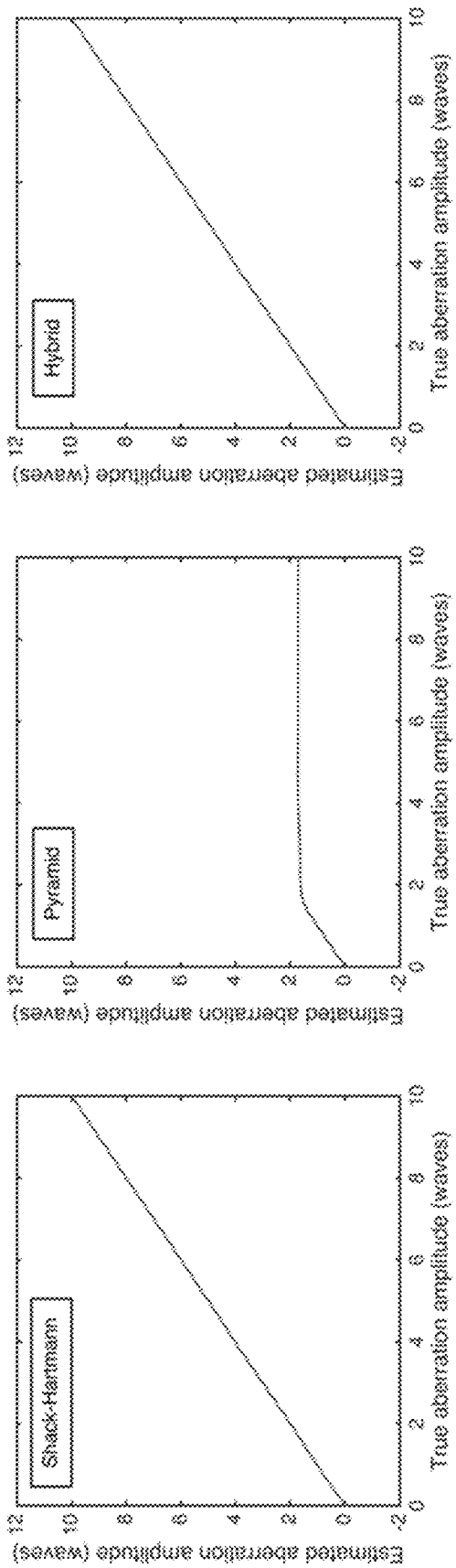
FIG. 3 illustrates example plots of wavefront estimation accuracy obtained based on implementations of the disclosed technology in comparison with existing systems.
Figure 4:
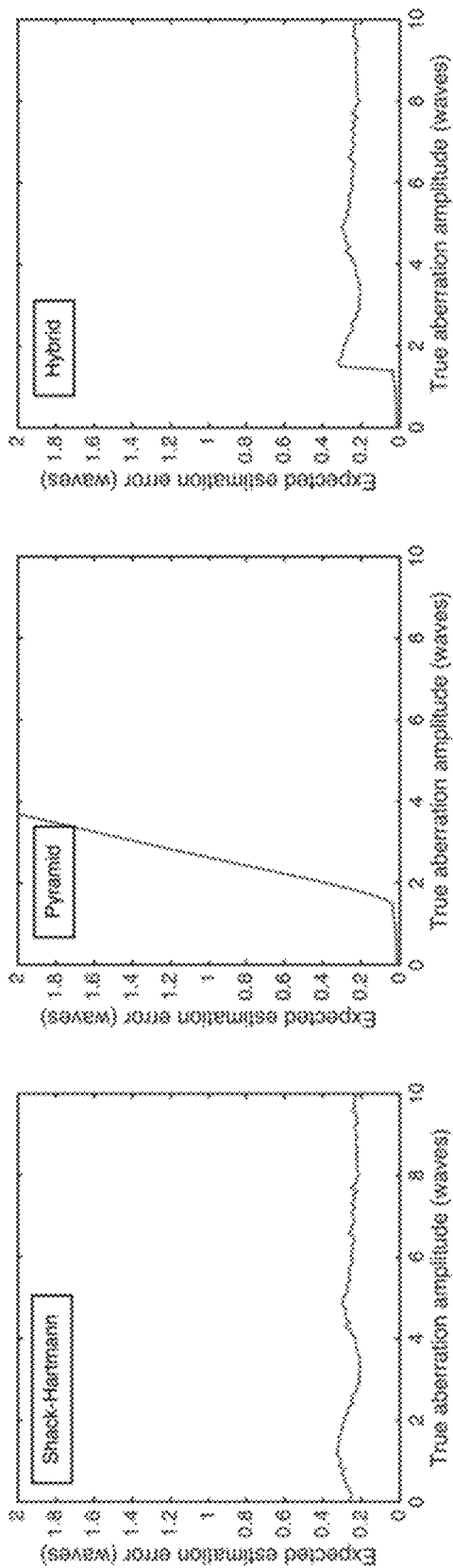
FIG. 4 illustrates example plots of expectations of wavefront estimation errors obtained based on implementations of the disclosed technology in comparison with existing systems.

Examples of improved performance achievable by the disclosed device are illustrated in the plots of FIG. 3 and FIG. 4. These plots are derived from a numerical simulation, which illustrate the accuracy (FIG. 3) and expectation value of the error (FIG. 4) with which the disclosed device estimates wavefront aberration as a function of aberration strength (labeled as "Hybrid" on far right) in comparison to the pyramid wavefront sensor (middle plot) and the Shack-Hartmann wavefront sensor (far left). In obtaining the results in FIGS. 3 and 4, the pyramid was taken to have 4 facets and the lenslet arrays each had 10 lenslets across the pupil diameter. Although the simulated model makes no assumptions about the details of the optics, typical values for the focal lengths of the collimating lens and lenslets of the arrays are 50 mm and 8 mm, respectively, with lenslet diameter of 128 microns. Note that a common architecture for a Shack-Hartmann wavefront sensor, which can be implemented in some embodiments, is to use larger lenslets (that are easier to make with a high fill factor) to form an array of spots in space and to employ a second lens to relay the spot pattern at reduced scale onto the detector.

As illustrated in FIG. 3, the Shack-Hartmann sensor is accurate over the full aberration range of 10 waves rms, as is the disclosed hybrid sensor. The pyramid sensor, however, is accurate only over a limited range of approximately 1.5 waves rms. FIG. 4 illustrates that the Shack-Hartmann estimation error (left) is approximately constant, while the pyramid sensor's estimation error is low for aberration less than 1.5 waves rms but rapidly increases thereafter. The disclosed hybrid sensor caps the estimation error at the lower of the bounds provided by the Shack-Hartmann and pyramid sensors separately.

Figure 5:
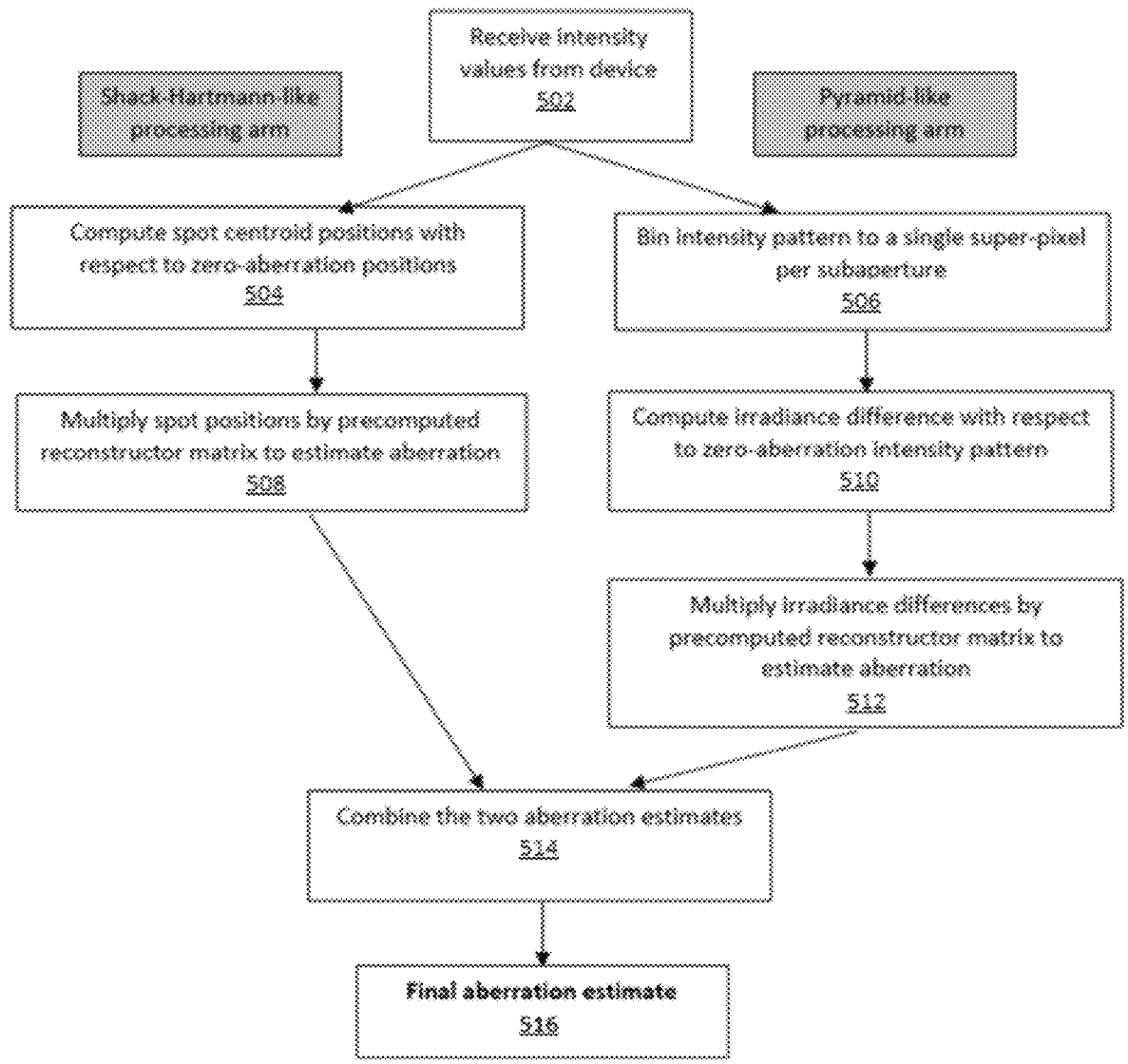
FIG. 5 illustrates a set of operations that can be carried out to obtain estimated wavefront aberrations in accordance with an exemplary embodiment.
Figure 6:
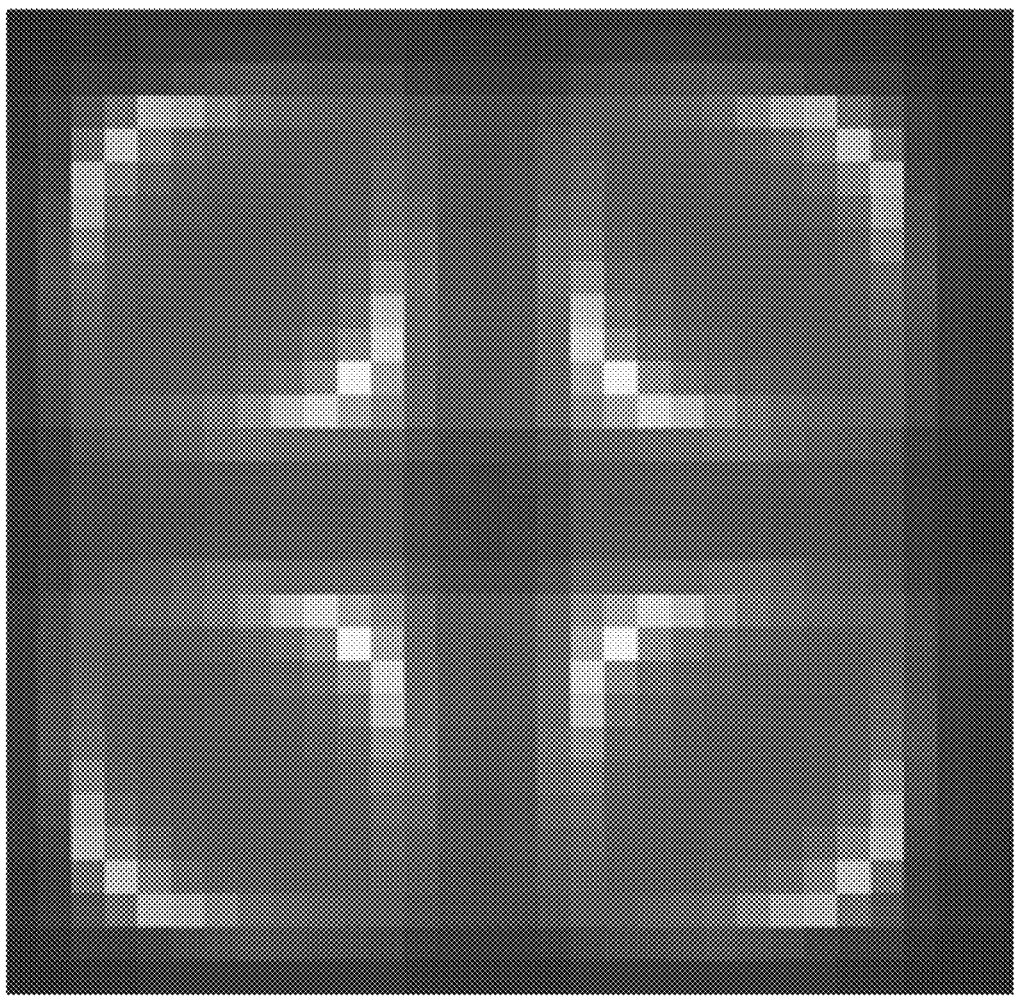
FIG. 6 illustrates an example of binned result produced as part of pyramid-like processing branch operations of a wavefront sensor in accordance with an exemplary embodiment.

The signals obtained from the disclosed wavefront sensor devices are processed to obtain estimates of the wavefront. FIG. 5 illustrates an example set of operations that can be carried out to obtain estimated wavefront aberration. As shown in FIG. 5, two different precomputed matrices can be used to map the separately processed Shack-Hartmann-like and pyramid-like signals into two estimates of the aberration. As part of the Shack-Hartmann-like processing branch on the left side of FIG. 5, at 502, intensity values from the sensor are received. At 504, the centroid positions of the intensity pattern are computed with respect to zero-aberration positions. At 508, the computed centroid spot positions are multiplied by a precomputed reconstructor matrix to obtain a first estimate of the aberration. Now moving to the pyramid-like processing branch, at 506, the received intensity pattern is binned to a single super-pixel for each subaperture. That is, each facet of the pyramid produces spot images through a set of subapertures (lenslets) as shown in FIG. 2. FIG. 6 shows an example of the binned result at the output of 606 for system having a pyramid with four facets.

Referring to back to FIG. 5, at 510, the irradiance difference with respect to the zero-aberration intensity pattern is computed. At 512, the computed irradiance difference is multiplied by a precomputed reconstructor matrix to obtain a second estimate of the aberration. At 514, the first and the second aberration estimates are combined. For example, the two estimates can be combined in a sigmoid filter to generate the final output of the sensor at 516. This can take the form of a vector of coefficients for a set of mode shapes, e.g., Zernike polynomials, disk harmonic modes, Karhunen-Loève modes, or other mode shapes, or may be directly the actuator commands intended to drive a deformable mirror to correct the aberration. Other types of filters besides the sigmoid can be used to combine the two sets of signals into a "best estimate" at the output.

Further, when constructing the disclosed wavefront sensors, additional considerations must be taken into account. For example, to estimate a given number of degrees of freedom in the aberrated wavefront, the disclosed technology reads a larger number of detector pixels compared to either the Shack-Hartmann or the pyramid sensors. Thus, the detector must be properly chosen to include additional pixels (compared to the detectors used in existing technologies) to prevent an increase in read noise that is included in the signal analysis. Such an increase in read noise will reduce the sensitivity of the device. Furthermore, in the measurement of dynamic aberration, for example in the atmosphere, the effectiveness of the sensor may be reduced because of a longer time delay in reading out all the detector pixels. These difficulties may be overcome by use of a sufficient number of noise-free detectors.

FIG. 7 illustrates a block diagram of a device 700 that can be used to implement certain aspects of the disclosed technology. For example, the device of FIG. 7 can be used to receive, process, store, provide for display and/or transmit various data and signals associated with disclosed image sensors. The device 700 comprises at least one processor 704 and/or controller, at least one memory 702 unit that is in communication with the processor 704, and at least one communication unit 706 that enables the exchange of data and information, directly or indirectly, through the communication link 708 with other entities, devices, databases and networks. The communication unit 706 may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The exemplary device 700 of FIG. 7 may be integrated as part of larger component (e.g., a computer, tablet, smart phone, etc.).

The processor(s) 704 may include central processing units (CPUs) to control the overall operation of, for example, the host computer. In certain embodiments, the processor(s) 704 accomplish this by executing software or firmware stored in memory 702. The processor(s) 704 may be, or may include, one or more programmable general-purpose or special-purpose microprocessors, digital signal processors (DSPs), programmable controllers, application specific integrated circuits (ASICs), programmable logic devices (PLDs), graphics processing units (GPUs), or the like, or a combination of such devices.

The memory 702 can be or can include the main memory of a computer system. The memory 702 represents any suitable form of random access memory (RAM), read-only memory (ROM), flash memory, or the like, or a combination of such devices. In use, the memory 702 may contain, among other things, a set of machine instructions which, when executed by processor 704, causes the processor 704 to perform operations to implement certain aspects of the presently disclosed technology.

In some non-limiting example embodiments, the disclosed wavefront sensors can be constructed using a crossed-roof prism in place of the optical pyramid to divide the incoming focused beam into four beams. A crossed-roof prism typically comprises two roof prisms that are orthogonally positioned next to each other, with the roof of one prism contacting the roof of the other prism. FIG. 8 illustrates an example of a crossed-roof prim that includes a first prism 802 and a second prism 804. In implementing the wavefront sensor using the crossed-roof prism, the incoming focused beam is incident on the base of a first prism 802, and the outgoing beam would include four beams, as illustrated. The crossed-roof prism can be manufactured at a lower cost (e.g., compared to the optical pyramid), and therefore enables the production of a less expensive wavefront sensor.

Referring back to FIGS. 1(A) and 1(B), in some embodiments, the optical pyramid can be a two-sided pyramid (e.g., a single roof prism). In such a configuration, two output beams from the pyramid are provided to two lenslet arrays (which may be implemented as different sections of a single substrate).

In one specific example implementation of the wavefront sensor, the following components are used to implement the sensor using a crossed-roof prism. Cross-roofed prism consists of two prisms made of BK7 glass, having antireflecting coatings and a roof angle of 0.75 degrees. The lenslet array comprises a 19×19 lenslet grid; the focal lengths of the lenslets are 1.5 mm and the diameter of each lenslet is 93.8 μm. The system sensor includes a magnification and compensation lens with a 1:1 pupil relay. At the imaging plane, a camera is positioned to receive the light from the lenslet arrays, with the following characteristics: pixel pitch of 3.1 μm; 8×8 lenslet images per pupil; 1 lenslet image pupil spacing.

In some non-limiting example embodiments, the disclosed wavefront sensors can be constructed using one or more spatial light modulators (SLMs). In one exemplary embodiment, an SLM replaces the optical pyramid shown in the configuration of FIGS. 1(A) and 1(B) to divide the incoming focused beam into at least three beams. In another example embodiment, an SLM replaces one or more of the lenslet arrays shown in the configuration of FIGS. 1(A) and 1(B); in this exemplary embodiment, the SLM can be programmed to provide the focusing functionality of each of the lenslet arrays. In still another exemplary embodiment, the SLMs can replace both the optical pyramid and the lenslet arrays. One advantage of using one or more SLMs is the ability to change optical characteristics of the components by re-programming the SLMs, without having to physically replace any components. For example, the focal length corresponding to the lenslet arrays (when replaced with SLMs) can be changed or the number of output beams from the optical pyramid (when replaced with an SLM) can be changed by re-reprogramming the SLMs. The SLMs can be controlled by control signals provided by a processor, such as the same processor that processes the electrical signals from the imaging detector or by a different processor.

An SLM is a programmable diffractive optical element, bending incoming light rays in a controllable way. An SLM can be programmed to operate on the light as a pyramid by commanding the SLM pixels to diffract the incoming light in the same manner as the facets of a pyramid. In similar fashion, an SLM can be commanded to operate on the light in the same manner as the relay lens, or to provide the focusing functionality of each of the lenslet arrays. An SLM typically modulates the intensity of light beam and can be implemented using different technologies. One type of SLM is called electronically addressable SLM (EASLM) that modulates individual pixels of the SLM device via an electrical input signal. Example EASLMs include digital micromirror devices (as in DLP, LCoS or others). Other types of SLMs include optically addressed spatial light modulators (OASLMs), also known as a light valve, in which an image of the OASLM is created and changed by providing light encoded with an image on its front or back surface. A photosensor allows the OASLM to sense the brightness of each pixel and replicate the image using liquid crystals.

As noted earlier, the disclosed technology provides improved performance compared to the existing systems. In particular, the hybrid wavefront sensors of the disclosed embodiments simultaneously provide the desired characteristics of high sensitivity, wide dynamic range, and linearity.

Another advantageous feature of the disclosed embodiments is the ability to produce a wavefront sensor that lacks any moving parts. The systems of prior art, including conventional pyramid sensors (typically used in astronomical applications), rely on moving components (e.g., oscillating mirrors), which add to the cost of implementation, and provide points of failure that can affect the reliability of the systems. The lack of moving parts can be especially beneficial in applications (e.g., deployments in space), where access to the wavefront sensor to remove or repair the components is difficult or even impossible. Additionally, in some existing pyramid wavefront sensors, the focused beam is modulated around the tip of the prism to somewhat improve the range of the wavefront sensor at the expense of the loss of sensitivity and increased cost and complexity of the wavefront sensor. In contrast, the wavefront sensors in accordance with the disclosed embodiments do not require such modulation, and are thus more reliable and can be produced at a lower cost.

Another feature of the disclosed technology relates to the ability to conduct the Shack-Hartmann-like and pyramid-like wavefront computations in parallel, which allows the wavefront errors to be obtained at a high speeds (with high accuracy and wide dynamic range).

The wavefront sensors disclosed herein find many applications that range from astronomy, to long distance laser communications, which can take place within the earth's atmosphere ("earth-to-earth," e.g., building-to-building, mountain-to-mountain, etc.) or from earth-to-space (e.g., communications with satellites or space telescopes, communications from earth to the moon or to Mars), as well as for space-to-space communications (e.g., satellite to satellite). For example, in search for exoplanets, due to the weakness of the received signals, it is essential to retain as much correction accuracy and range as possible—features that are hallmarks of the disclosed technology.

FIG. 9 illustrates a set of operations that can be carried out to produce an estimate of a wavefront aberration in accordance with an exemplary embodiment. At 902, a set of intensity values from a wavefront sensor device is received that includes both an optical pyramid comprising multiple facets, and a plurality of lenslet arrays that receive the light existing the plurality of pyramid facets. At 904, a first estimate of the wavefront aberration associated with the light that exits each of the plurality of lenslets in the lenslet arrays is obtained. At 906, a second estimate of the wavefront aberration associated the light that exits the pyramid facets is obtained, and at 908 the first estimate and the second estimate to obtain a final aberration estimate.

In some embodiments, obtaining the first estimate includes using the set of intensity values to compute spot centroid positions with respect to zero-aberration positions, and modifying the computed centroid positions by a first set of precomputed values. Obtaining the second estimate can include, for the intensity values corresponding to each subaperture, producing a single intensity value, computing irradiance differences with respect to zero-aberration intensity pattern, and modifying the computed irradiance differences by a second set of precomputed values. In one exemplary embodiment, the first or the second set of precomputed values includes precomputed reconstructor matrix values. In still another exemplary embodiment, modifying the computed centroid positions by the first set of precomputed values includes multiplying the computed centroid positions by the first set of precomputed values. According to another exemplary embodiment, modifying the computed irradiance differences by the second set of precomputed values includes multiplying the computed irradiance differences by the second set of precomputed values. In another exemplary embodiment, combining the first estimate and the second estimate includes using a sigmoid filter.

In one aspect of the disclosed embodiments, a wavefront sensor is provided that includes an optical pyramid positioned at a focal plane of an incoming light beam incident on a tip of the optical pyramid; the optical pyramid includes at least three facets that each allow a portion of the incoming light beam to exit the optical pyramid. The wavefront sensor further includes a plurality of lenslet arrays positioned to receive the portions of the light beam that exit the optical pyramid, one or more imaging lenses positioned between the optical pyramid and the plurality of lenslet arrays, and a detector positioned to receive light after propagation through the plurality of the lenslet arrays. In one exemplary embodiment, the optical pyramid has four facets. In another exemplary embodiment, the optical pyramid includes internally reflecting surfaces that allow the portions of the incoming light beam to exit the optical pyramid after reflection from the internally reflecting surfaces. In still another exemplary embodiment, the optical pyramid includes transmissive surfaces that allow the portions of the incoming light beam to exit the optical pyramid after transmission through the transmissive surfaces.

In one exemplary embodiment, the plurality of lenslet arrays includes three lenslet arrays. In another exemplary embodiment, the detector is positioned at a focal plane of the plurality of the lenslet arrays. In yet another exemplary embodiment, the tip of the optical pyramid has more than four sides. According to yet another exemplary embodiment, the wavefront sensor further includes a processor, and a memory comprising processor executable instructions stored thereupon; the processor executable instructions, when executed by the processor, cause the processor to receive a plurality of intensity values from the detector and process the received intensity values to estimate a wavefront aberration. In one exemplary embodiment, the processor executable instructions, when executed by the processor, cause the processor to estimate the wavefront aberration according to the process described in FIG. 5. In another exemplary embodiment, the processor executable instructions, when executed by the processor, cause the processor to generate an output indicative of an estimated aberration or a correction that is needed to compensate for the estimated aberration.

According to one aspect of the disclosed technology, a wavefront sensor includes an optical pyramid positioned to receive a focused incoming light beam on a tip of the optical pyramid; the optical pyramid includes at least three facets that each allow a portion of the focused incoming light beam to exit the optical pyramid. The wavefront sensor further one or more imaging lenses positioned to receive light that exits each of the facets of the optical pyramid, and one or more lenslet arrays positioned to receive light from the one or more imaging lenses and to produce a plurality of focused light spots corresponding to the lenslets of the lenslet array; the focused light spots, upon detection of by a detector, enable a determination of a wavefront error of the incoming light beam. In one exemplary embodiment, the wavefront sensor further includes one or more detectors positioned at a focal plane of the one or more lenslet arrays to receive the focused light spots produced by the one more lenslet arrays.

In one exemplary embodiment, the optical pyramid includes internally reflecting surfaces that allow the portions of the focused incoming light beam to exit the optical pyramid after reflection from the internally reflecting surfaces. In some embodiments, the one or more lenslet arrays consist of a single lenslet array positioned to receive light corresponding to each of the portions of the focused light that exit the optical pyramid at different locations on the single lenslet array. In another exemplary embodiment, the one or more lenslet arrays include a plurality of lenslet arrays, each positioned to receive light corresponding to one of the portions of the focused light that exits the optical pyramid.

In another exemplary embodiment, the one or more imaging lenses consist of a single imaging lens positioned to receive light corresponding to each of the portions of the focused light that exit the optical pyramid at different locations on the single imaging lens. In another exemplary embodiment, the wavefront sensor further comprises a processor, and a memory comprising processor executable instructions stored thereupon; the processor executable instructions, upon execution by the processor, cause the processor to receive a plurality of intensity values from the one or more detectors and to process the received intensity values to estimate the wavefront error. In another exemplary embodiment, the processor executable instructions, upon execution by the processor, cause the processor to generate an output indicative of an estimated aberration or a correction that is needed to compensate for the estimated aberration.

Another aspect of the disclosed embodiments relates to a wavefront sensor that includes a first optical element configured to receive an incoming light beam and to produce a plurality of spatially separated beams that exit the first optical element, and one or more lenses positioned to receive the plurality of spatially separated beams and to provide each of the spatially separated beams to a second optical element. The second optical element of the wavefront sensor is positioned to receive the plurality of spatially separated beams from the one or more lenses and, for each spatially separated beam, produce a corresponding plurality of focused light spots, where the plurality of the focused light spots, upon detection of by a detector, enable a determination of a wavefront error of the incoming light beam.

In one exemplary embodiment, the first optical element is one of: a crossed-roof prism, an optical pyramid, or a spatial light modulator. In another example embodiment, the first optical element is one of an optical pyramid or a roof prism, configured to produce at least two spatially separated beams. In another exemplary embodiment, the second optical element comprises one or more of: a spatial light modulator or a lenslet array. In still another exemplary embodiment, one or both of the first or the second optical elements comprise a spatial light modulator that is configured to be re-programmed to enable a change in optical characteristics of the first or the second optical element.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Aspects of the subject matter described in this specification can be implemented as one or more computer program products, e.g., one or more modules of computer program instructions encoded on a tangible and non-transitory computer readable medium for execution by, or to control the operation of, data processing apparatus. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. While operations are depicted in the drawings in a particular order, this should not be understood as requiring that such operations be performed in the particular order shown or in sequential order, or that all illustrated operations be performed, to achieve desirable results. The features of the embodiments described herein may be combined in all possible combinations of methods, apparatus, modules, and systems.

What is claimed is:

1. A wavefront sensor, comprising:
   an optical pyramid positioned to receive a focused incoming light beam on a tip of the optical pyramid, the optical pyramid including at least three facets that each allow a portion of the focused incoming light beam to exit the optical pyramid;
   one or more imaging lenses positioned to receive light that exits each of the facets of the optical pyramid; and
   one or more lenslet arrays positioned to receive light from the one or more imaging lenses and to produce a plurality of focused light spots corresponding to lenslets of the lenslet array, wherein
   the focused light spots, upon detection by a detector, enable a determination of a wavefront error of the incoming light beam.

2. A wavefront sensor of claim 1, further comprising one or more detectors positioned at a focal plane of the one or more lenslet arrays to receive the focused light spots produced by the one more lenslet arrays.

3. The wavefront sensor of claim 1, wherein the wavefront sensor excludes any moving components.

4. The wavefront sensor of claim 1, wherein the optical pyramid has four facets.

5. The wavefront sensor of claim 1, wherein the optical pyramid includes internally reflecting surfaces that allow the portions of the focused incoming light beam to exit the optical pyramid after reflection from the internally reflecting surfaces.

6. The wavefront sensor of claim 1, wherein the one or more lenslet arrays consist of a single lenslet array positioned to receive light corresponding to each of the portions of the focused light that exit the optical pyramid at different locations on the single lenslet array.

7. The wavefront sensor of claim 1, wherein the one or more lenslet arrays include a plurality of lenslet arrays, each positioned to receive light corresponding to one of the portions of the focused light that exits the optical pyramid.

8. The wavefront sensor of claim 1, wherein the one or more imaging lenses consists of a single imaging lens positioned to receive light corresponding to each of the portions of the focused light that exit the optical pyramid at different locations on the single imaging lens.

9. The wavefront sensor of claim 2, further comprising:
a processor; and
a memory comprising processor executable instructions stored thereupon, wherein the processor executable instructions, upon execution by the processor, cause the processor to receive a plurality of intensity values from the one or more detectors and to process the received intensity values to estimate the wavefront error.

10. The wavefront sensor of claim 9, wherein the processor executable instructions, upon execution by the processor, cause the processor to generate an output indicative of an estimated aberration or a correction that is needed to compensate for the estimated aberration.

11. A method for producing an estimate of a wavefront aberration, the method comprising:
receiving a set of intensity values from a wavefront sensor device that includes both an optical pyramid comprising multiple facets, and a plurality of lenslet arrays that receive the light existing the plurality of pyramid facets;
obtaining a first estimate of the wavefront aberration associated with the light that exits each of the plurality of lenslets in the lenslet arrays:
obtaining a second estimate of the wavefront aberration associated the light that exits the pyramid facets; and
combining the first estimate and the second estimate to obtain a final aberration estimate.

12. The method of claim 11, wherein:
obtaining the first estimate includes:
using the set of intensity values to compute spot centroid positions with respect to zero-aberration positions, and
modifying the computed centroid positions by a first set of precomputed values; and
obtaining the second estimate includes:
for the intensity values corresponding to each subaperture, producing a single intensity value, and
computing irradiance differences with respect to zero-aberration intensity pattern, and
modifying the computed irradiance differences by a second set of precomputed values.

13. The method of claim 12, wherein the first or the second set of precomputed values includes precomputed reconstructor matrix values.

14. The method of claim 12, wherein modifying the computed centroid positions by the first set of precomputed values includes multiplying the computed centroid positions by the first set of precomputed values.

15. The method of claim 12, wherein modifying the computed irradiance differences by the second set of precomputed values includes multiplying the computed irradiance differences by the second set of precomputed values.

16. The method of claim 11, wherein combining the first estimate and the second estimate includes using a sigmoid filter.

17. A wavefront sensor, comprising:
a first optical element configured to receive a focused incoming light beam and to produce a plurality of spatially separated beams that exit the first optical element; and
one or more lenses positioned to receive the plurality of spatially separated beams and to provide each of the spatially separated beams to a second optical element;
the second optical element, positioned to receive the plurality of spatially separated beams from the one or more lenses and, for each spatially separated beam, produce a corresponding plurality of focused light spots, wherein
the plurality of the focused light spots, upon detection of by a detector, enable a determination of a wavefront error of the incoming light beam.

18. The wavefront sensor of claim 17, wherein the first optical element is one of: a crossed-roof prism, an optical pyramid, or a spatial light modulator.

19. The wavefront sensor of claim 17, wherein the first optical element is one of an optical pyramid or a roof prism, configured to produce at least two spatially separated beams.

20. The wavefront sensor of claim 17, wherein the second optical element comprises one or more of: a spatial light modulator or a lenslet array.

21. The wavefront sensor of claim 17, wherein one or both of the first or the second optical elements comprise a spatial light modulator that is configured to be re-programmed to enable a change in optical characteristics of the first or the second optical element.

22. The wavefront sensor of claim 17, further comprising:
one or more detectors positioned at a focal plane of the second optical element to receive the plurality of focused light spots; and
a processor, and a memory comprising processor executable instructions stored thereupon, wherein the processor executable instructions, upon execution by the processor, cause the processor to receive a plurality of intensity values from the one or more detectors and to process the received intensity values to estimate the wavefront error.

* * * * *